(12) United States Patent
Kusama et al.

(10) Patent No.: US 11,567,244 B2
(45) Date of Patent: Jan. 31, 2023

(54) LIGHT DIFFUSION CONTROL MEMBER AND REFLECTIVE DISPLAY BODY

(71) Applicant: LINTEC CORPORATION, Tokyo (JP)

(72) Inventors: Kentaro Kusama, Tokyo (JP); Baku Katagiri, Tokyo (JP); Tatsuki Kuramoto, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 116 days.

(21) Appl. No.: 17/119,004

(22) Filed: Dec. 11, 2020

(65) Prior Publication Data

US 2021/0191004 A1 Jun. 24, 2021

(30) Foreign Application Priority Data

Dec. 13, 2019 (JP) .............................. JP2019-225517

(51) Int. Cl.
*G06F 3/147* (2006.01)
*G02B 5/02* (2006.01)

(52) U.S. Cl.
CPC ........... *G02B 5/0236* (2013.01); *G06F 3/147* (2013.01)

(58) Field of Classification Search
CPC .................................................. G02B 5/0236
USPC ........................... 359/599; 382/115; 313/112
See application file for complete search history.

(56) References Cited

U.S. PATENT DOCUMENTS

| 8,619,363 | B1* | 12/2013 | Coleman | G02B 19/0066 359/599 |
|---|---|---|---|---|
| 2007/0218261 | A1* | 9/2007 | Saitoh | B32B 27/08 313/112 |
| 2008/0112596 | A1* | 5/2008 | Rhoads | G07D 7/12 382/115 |
| 2016/0077246 | A1 | 3/2016 | Kusama et al. | |
| 2019/0097722 | A1* | 3/2019 | McLaurin | H04B 10/116 |
| 2020/0134773 | A1* | 4/2020 | Pinter | G01B 11/25 |
| 2020/0257153 | A1* | 8/2020 | Robinson | G02B 5/0221 |
| 2020/0309337 | A1* | 10/2020 | Yui | G02B 5/00 |

FOREIGN PATENT DOCUMENTS

JP 2013-37337 2/2013
JP 6250648 12/2017

* cited by examiner

*Primary Examiner* — Ruay Ho
(74) *Attorney, Agent, or Firm* — Greenblum & Bernstein, P.L.C.

(57) ABSTRACT

A light diffusion control member includes a first light diffusion control layer and a second light diffusion control layer. The first light diffusion control layer and the second light diffusion control layer each has a regular internal structure that includes a plurality of regions having a relatively high refractive index in a region having a relatively low refractive index. The first light diffusion control layer and the second light diffusion control layer are laminated so that an angle between two respective vectors determined based on the regular internal structure in the first light diffusion control layer and the second light diffusion control layer is more than 0° and 90° or less.

8 Claims, 5 Drawing Sheets

US 11,567,244 B2

LIGHT DIFFUSION CONTROL MEMBER AND REFLECTIVE DISPLAY BODY

TECHNICAL FIELD

The present invention relates to a light diffusion control member including a light diffusion control layer that can transmit and diffuse the incident light within a predetermined incident angle range in a strong and low light loss state and relates also to a reflective display body including the light diffusion control member.

BACKGROUND ART

Display bodies such as liquid crystal display devices, organic electroluminescence (EL) displays, and electronic paper include those classified into reflective display bodies including reflective layers. In such reflective display bodies, the display surface of a reflective display body is generally illuminated by a light source such as an indoor light or the sun and/or a light source provided on the display surface side of the display body, and light from these light sources is reflected by the reflective layer into reflected light, which enables good visibility of the display.

When using the reflective display body, the positional relationship between the light source and the viewer is usually not fixed due to the use of an external light source. This may result in a problems in that, depending on the position of the light source, insufficient light reaches the viewer to deteriorate the visibility and the entire display body cannot be illuminated brightly. To solve such a problem, it is conceivable to incorporate a light diffusion plate into the display body. However, simply incorporating a general light diffusion plate may lead to another problem in that the diffusivity necessary for good visibility cannot be sufficiently obtained and, if attempting to achieve high diffusion, light loss due to stray light or backscattering occurs to impair the image clarity. From the viewpoint of solving these problems, in the reflective display bodies, it is considered that a light diffusion control layer that can transmit and diffuse the incident light within a predetermined incident angle range in a strong and low light loss state is provided between the surface on the viewer side and the reflective layer (Patent Document 1, for example). The existence of the above light diffusion control layer allows the light reflected from the reflective layer to be moderately diffused, and the deterioration in the visibility depending on the position of the light source can thus be reduced.

It is also considered to stack two or more of the above-described light diffusion control layers. For example, Patent Document 2 discloses a light diffusion control member including two light diffusion control layers. In particular, Patent Document 2 discloses an example of the light diffusion control member in which two light diffusion control layers are laminated so that the directional characteristics of transmitted and diffused light are opposite to each other.

PRIOR ART DOCUMENTS

Patent Documents

[Patent Document 1] JP6250648B
[Patent Document 2] JP2013-37337A

SUMMARY OF THE INVENTION

Problems to be Solved by the Invention

Many smartphones and tablets in recent years have a function of switching the up-down direction of display content in accordance with the vertical posture of the display surface. That is, when the short sides of the display surface are parallel to the ground, the display content is displayed such that the up-down direction of the display content is parallel to the long sides of the display surface, while when the long sides of the display surface are parallel to the ground, the display content is displayed such that the up-down direction of the display content is parallel to the short sides of the display surface.

In such a reflective display body configured such that the up-down direction of display content on the display surface can be changed, when the up-down direction of the display content is changed, the effect of the above-described light diffusion control layer on the improvement of visibility cannot be sufficiently obtained, which may be problematic. For example, even when good visibility is obtained in the case of displaying the display content such that the up-down direction of the display content is parallel to the long sides of the display surface, if the long sides of the display surface are set parallel to the ground to display the display content such that the up-down direction of the display content is parallel to the short sides of the display surface, the light diffusion control layer cannot sufficiently exhibit the above effect, and satisfactory visibility is not obtained, which may also be problematic.

The present invention has been made in consideration of such actual circumstances and an object of the present invention is to provide a light diffusion control member that can achieve excellent visibility regardless of the up-down direction of display content even when the light diffusion control member is incorporated in a reflective display body in which the up-down direction of the display content is changed. Another object of the present invention is to provide a reflective display body having such visibility.

Means for Solving the Problems

To achieve the above objects, first, the present invention provides a light diffusion control member comprising: a first light diffusion control layer; and a second light diffusion control layer laminated on one surface side of the first light diffusion control layer, wherein the first light diffusion control layer and the second light diffusion control layer each have a regular internal structure comprising a plurality of regions having a relatively high refractive index in a region having a relatively low refractive index, wherein when a first surface is defined as a surface of the light diffusion control member proximal to the first light diffusion control layer and a second surface is defined as a surface of the light diffusion control member proximal to the second light diffusion control layer, the regions having the relatively high refractive index extend from the second surface side toward the first surface side and a straight line parallel to an extending direction of the regions is tilted with respect to a thickness direction of the light diffusion control member in each of the first light diffusion control layer and the second light diffusion control layer, wherein the first light diffusion control layer and the second light diffusion control layer are laminated so that, when assuming, in the first light diffusion control layer and the second light diffusion control layer, respective vectors that are parallel to the extending direction and directed from the second surface side toward the first surface side, an angle between two vectors obtained by projecting the respective vectors onto the first surface is more than 0° and 90° or less (Invention 1).

In the light diffusion control member according to the above invention (Invention 1), the first light diffusion control layer and the second light diffusion control layer are laminated so that the angle between the above-described two vectors is more than 0° and 90° or less; therefore, in the case where the light diffusion control member is incorporated in a reflective display body in which the up-down direction of display content is changed, uniform and satisfactory brightness can be achieved even when the up-down direction of the display content is changed, and as a result, excellent visibility can be achieved.

In the above invention (Invention 1), at least in one of the first light diffusion control layer and the second light diffusion control layer, the regions having the relatively high refractive index may be preferably columnar bodies extending from the second surface side toward the first surface side, and the regular internal structure may be preferably a column structure configured such that the columnar bodies are densely arranged to stand in the region having the relatively low refractive index (Invention 2).

In the above invention (Invention 2), the columnar bodies may be preferably bent between one ends and other ends of the columnar bodies (Invention 3).

Second, the present invention provides a light diffusion control member comprising a light diffusion control layer, the light diffusion control layer having a regular internal structure comprising a plurality of regions having a relatively high refractive index in a region having a relatively low refractive index, wherein when preparing a measurement sample by laminating the light diffusion control member on a reflective surface of a mirror; irradiating an arbitrary one point on a surface of the measurement sample on the light diffusion control member side with light rays from each of four directions of orientation angles of 0°, 90°, 180°, and 270° around the one point to cause reflected light to be diffused and reflected from the one point at each of the orientation angles, the light rays forming an angle of 30° with a normal line of the surface of the measurement sample, the reflected light including reflected light directed in a front direction of the surface of the measurement sample; measuring, at the orientation angles, respective luminance values (cd/m$^2$) of the reflected light directed in the front direction of the surface of the measurement sample; and representing a minimum luminance value and a maximum luminance value among the obtained four luminance values as $L_{min}$ and $L_{max}$, respectively, and irradiating an arbitrary one point on one surface of any standard white plate with light rays from the orientation angle at which the $L_{min}$ is measured, the light rays forming an angle of 30° with a normal line of the one surface; and representing the luminance value (cd/m$^2$) of reflected light obtained by diffusion and reflection from the one point in the front direction as $L_{STD}$, $L_1$ represented by $L_1 = L_{min}/L_{STD}$ satisfies the following expression (1):

$$L_1 > 1.00 \qquad (1), \text{ and}$$

$L_2$ represented by $L_2 = L_{min}/L_{max}$ satisfies the following expression (2):

$$0.6 \leq L_2 \leq 1.00 \qquad (2),$$

wherein when irradiating an arbitrary one point on a surface of the measurement sample on the light diffusion control member side with light rays from each of four directions of orientation angles of 0°, 90°, 180°, and 270° around the one point to cause reflected light to be diffused and reflected from the one point at each of the orientation angles, the light rays forming an angle of 30° with a normal line of the surface of the measurement sample, the reflected light including reflected light beams that travel in a plane including the one point and the nominal line and are perpendicular to the orientation angle of irradiation with the light rays, the reflected light beams forming an angle of 30° or less with the normal line; and representing a standard deviation value (cd/m$^2$) of luminance values of the reflected light beams as $L_3$, the light diffusion control member satisfies the following expression (3) in all the four directions:

$$L_3 < 2.00 \qquad (3) \text{ (Invention 4).}$$

Third, the present invention provides a reflective display body configured such that an up-down direction of display content on a display surface can be changed, the reflective display body comprising: the light diffusion control member (Invention 1 to 4); a display device provided on one surface side of the light diffusion control member; and a reflective layer provided on a surface side of the display device opposite to the light diffusion control member or incorporated in the display device Invention 5).

Advantageous Effect of the Invention

According to the light diffusion control member of the present invention, a reflective display body that can achieve excellent visibility regardless of the up-down direction of display content can be achieved.

EMBODIMENTS FOR CARRYING OUT THE INVENTION

Hereinafter, one or more embodiments of the present invention will be described.

Figure 1:
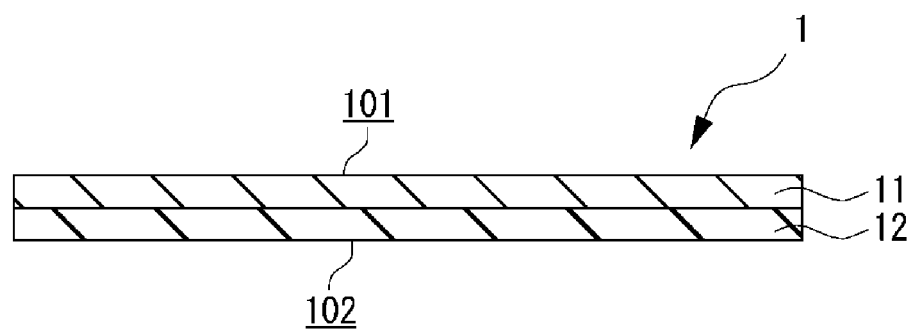
FIG. 1 is a cross-sectional view of a light diffusion control member according to an embodiment of the present invention.

FIG. 1 illustrates a cross-sectional view of the light diffusion control member according to an embodiment of the present invention. The light diffusion control member 1 according to the present embodiment preferably includes a first light diffusion control layer 11 and a second light diffusion control layer 12 laminated on one surface side of the first light diffusion control layer 11. In the light diffusion control member 1 according to the present embodiment, a first surface 101 is defined as a surface of the light diffusion control member 1 proximal to the first light diffusion control layer 11 and a second surface 102 is defined as a surface of the light diffusion control member 1 proximal to the second light diffusion control layer 12.

Figure 2:
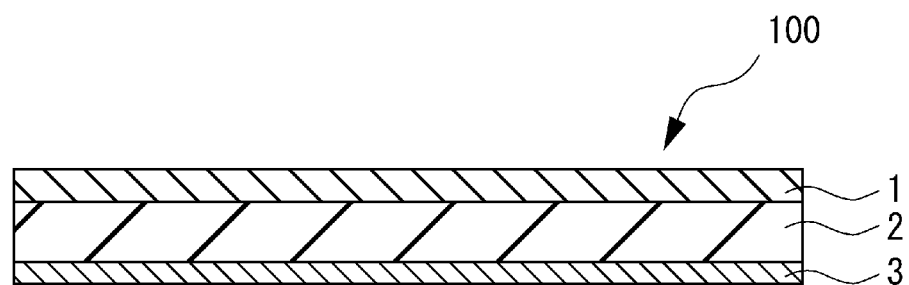
FIG. 2 is a cross-sectional view of an example of a reflective display body manufactured using the light diffusion control member according to an embodiment of the present invention.

The light diffusion control member 1 according to the present embodiment can be suitably used for manufacturing a reflective display body. FIG. 2 illustrates a cross-sectional view of an example of such a reflective display body. The reflective display body 100 may include the above-described light diffusion control member 1, a display device 2 provided on one surface side of the light diffusion control member 1, and a reflective layer 3 provided on a surface side of the display device 2 opposite to the light diffusion control member 1. The reflective display body 100 according to the present embodiment may be preferably configured such that the up-down direction of display content on the display surface can be changed.

Figure 3:
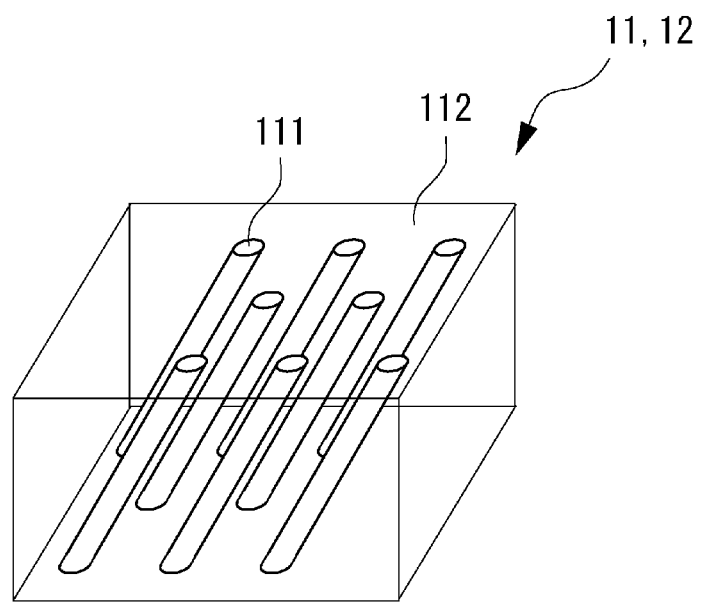
FIG. 3 is a perspective view schematically illustrating an example of a regular internal structure (column structure) of a light diffusion control layer in an embodiment of the present invention.

In the light diffusion control member 1 according to the present embodiment, each of the first light diffusion control layer 11 and the second light diffusion control layer 12 (these layers may be collectively referred to as a "light diffusion control layer 11, 12," hereinafter) may preferably have a regular internal structure that includes a plurality of regions having a relatively high refractive index in a region having a relatively low refractive index. In the perspective view of FIG. 3, a column structure (details will be described later) is schematically illustrated as an example of such a regular internal structure. As illustrated in FIG. 3, the light diffusion control layer 11, 12 may have a structure in which regions 111 (columnar bodies) having a relatively high refractive index extend in the thickness direction of the light diffusion control layer 11, 12, and the surroundings of the regions 111 are filled with a region 112 having a relatively low refractive index. Here, the regular internal structure refers to an internal structure configured such that the plurality of regions 111 having a relatively high refractive index is arranged with a predetermined regularity in the region 112 having a relatively low refractive index (for example, an internal structure configured such that, when viewing a cross section obtained by cutting the light diffusion control layer 11, 12 along a plane parallel to the surface of the light diffusion control layer 11, 12, that is, a cross section obtained by cutting the light diffusion control layer 11, 12 at a position at which the above regular internal structure exists, the regions 111 having a relatively high refractive index are repeatedly arranged at a similar pitch along at least one direction in the above cross section in the region 112 having a relatively low index). Thus, the regular internal structure as referred to herein has a feature that the regions 111 having a relatively high refractive index extend in the thickness direction of the light diffusion control layer 11, 12, and this feature is distinguished from those of a phase-separation structure in which one phases exist in the other phase without clear regularity and a sea-island structure in which approximately spherical island components exist in a sea component.

Figure 4:
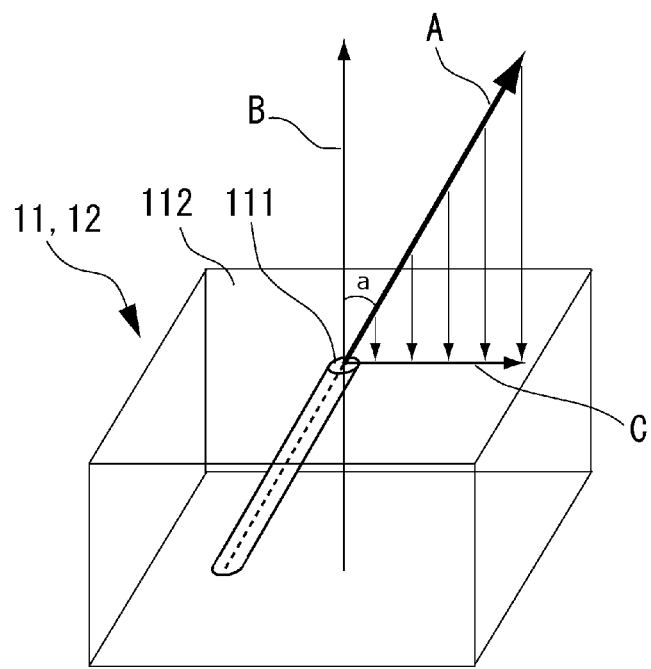
FIG. 4 is a perspective view for describing some directions related to the light diffusion control layer in an embodiment of the present invention.

In each of the first light diffusion control layer 11 and the second light diffusion control layer 12, the regions 111 having a relatively high refractive index may preferably extend from the second surface 102 side toward the first surface 101 side of the light diffusion control member 1, and a straight line parallel to the extending direction of the regions 111 may be preferably tilted with respect to the thickness direction of the light diffusion control member 1. This will be described in detail with reference to FIG. 4. The perspective view of FIG. 4 is drawn, for descriptive purposes, by leaving only one of the plurality of regions 111 having a relatively high refractive index, which exist originally in the light diffusion control layer 11, 12, and omitting the other regions 111. In FIG. 4, the regions 111 having a relatively high refractive index extend from the second surface 102 side toward the first surface 101 side (in FIG. 4, from the lower side toward the upper side), and the straight line parallel to the extending direction (direction A) of the regions 111 is tilted with respect to the thickness direction (direction B) of the light diffusion control layer 11, 12 by and angle "a."

The angle "a" can be expressed using vectors as follows. First, vector A is defined as a vector that is parallel to the extending direction (direction A) and directed from the second surface 102 side toward the first surface 101 side (in FIG. 4, from the lower side toward the upper side). Then, vector B is defined as a vector that is parallel to the thickness direction of the light diffusion control layer 11, 12 and directed from the second surface 102 side toward the first surface 101 side (in FIG. 4, from the lower side toward the upper side). In this case, the angle "a" can be expressed as an angle between the vector A and the vector B. Basically, a "vector" used as a means for expressing the present invention has an important meaning in its direction. In this regard, unless otherwise stated, the term "vector" in the present specification shall be construed as having a vector quantity of arbitrary magnitude.

Figure 5:
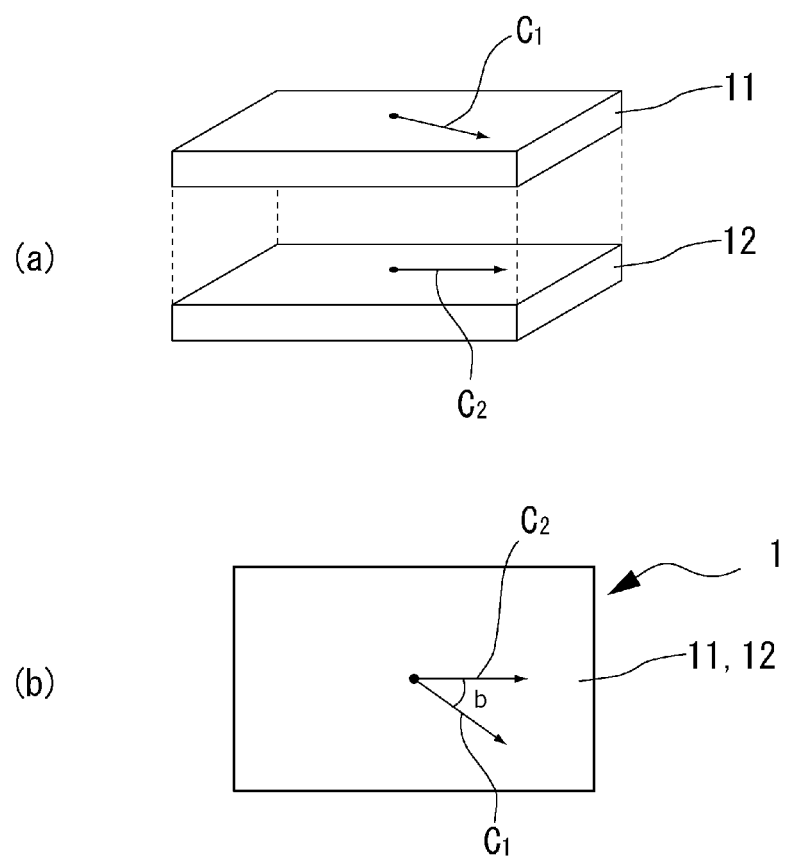
FIG. 5 is a set of diagrams including a plan view for describing the relationship between the direction of a first light diffusion control layer and the direction of a second light diffusion control layer in the light diffusion control member according to an embodiment of the present invention.

In the light diffusion control member 1 according to the present embodiment, the first light diffusion control layer 11 and the second light diffusion control layer 12 may be preferably laminated so as to satisfy the following conditions. First, the above-described vector A is assumed for each of the light diffusion control layers 11 and 12, and as illustrated in FIG. 4, vector C is defined as a vector obtained by projecting the vector A onto the first surface 101 (upper surface in FIG. 4). Then, a state of lamination of the first light diffusion control layer 11 and the second light diffusion control layer 12 will be described with reference to FIG. 5. FIG. 5(a) schematically illustrates a state in which the first light diffusion control layer 11 and the second light diffusion control layer 12 are laminated. FIG. 5(b) is a diagram in which the light diffusion control member 1 composed of the laminated first light diffusion control layer 11 and second light diffusion control layer 12 is viewed in a plane from the first surface 101 side. As illustrated in FIG. 5(a), vector $C_1$ is defined as the vector C for the first light diffusion control layer 11, and vector $C_2$ is defined as the vector C for the second light diffusion control layer 12. Then, as illustrated in FIG. 5(b), an angle "b" is defined as the angle between the vector $C_1$ and the vector $C_2$. At that time, in the light diffusion control member 1 according to the present embodiment, the first light diffusion control layer 11 and the second light diffusion control layer 12 may be preferably laminated so that the angle "b" is more than 0° and 90° or less.

In a light diffusion control member provided in a conventional reflective display body, the light diffusion control layer may be simply a single layer, or even when two light diffusion control layers are provided, the above-described angle "b" may not satisfy the condition of more than 0° and 90° or less, such as being 180°. In such a reflective display body, when the reflective display body is turned on its side to change the up-down direction of display content, for example, a problem may arise in that the light emitted from above the display cannot be sufficiently diffused and reflected in the front direction and the variation in the brightness of display is large due to a change in the irradiation direction.

In contrast, fortunately, in the light diffusion control member 1 according to the present embodiment, the first light diffusion control layer 11 and the second light diffusion control layer 12 are laminated so that the above-described angle "b" is more than 0° and 90° or less, and a reflective display body incorporating the light diffusion control member 1 can thereby have excellent visibility. Specifically, first, the light emitted from the outside can be effectively diffused and reflected in the front direction to achieve bright display as compared with when the light diffusion control member 1 is not provided. Moreover, even when the reflective display body is turned on its side to change the up-down direction of display content, for example, the variation in the brightness of display due to the change of the up-down direction can be suppressed to achieve the display with uniform brightness. Furthermore, even when the direction of light emitted from the outside changes, the light can be diffused and reflected at uniform brightness with respect to the horizontal direction for the viewer, and the viewer is less likely to recognize the unevenness of brightness.

From the viewpoint of effectively achieving the brighter display as compared with when the light diffusion control member 1 is not provided as described above, the above-described angle "b" may be preferably 10° or more, particularly preferably 40° or more, and further preferably 50° or more. From the same viewpoint, the above-described angle "b" may be preferably 90° or less, particularly preferably 80° or less, and further preferably 70° or less.

From the viewpoints of more effectively achieving the uniform brightness even when the up-down direction is changed and more effectively achieving the display with which the viewer is less likely to recognize the unevenness of brightness, the above-described angle "b" may be preferably 10° or more, particularly preferably 60° or more, and further preferably 70° or more. From the same viewpoint, the above-described angle "b" may be preferably 90° or less.

In the light diffusion control member 1 according to the present embodiment, the previously described angle "a" may be preferably more than 0°, particularly preferably 1° or more, and further preferably 2° or more. The angle "a" within such a range allows the display content to be more brightly displayed. From another aspect, the above angle "a" may be preferably 30° or less, particularly preferably 15° or less, further preferably 8° or less, and most preferably 5° or less. The angle "a" within such a range allows the difference in the brightness to be more reduced when the up-down direction of the display content is changed. The above angle "a" can be measured by observing the cross section of the light diffusion control layer 11, 12 using an optical digital microscope.

In the light diffusion control member 1 according to the present embodiment, when the regular internal structure is the above-described column structure and the regions 111 having a relatively high refractive index are the above-described columnar bodies, the columnar bodies may be bent between one ends and the other ends. In this case, the above-described extending direction (direction A) refers to an extending direction of the columnar bodies from the bending portions to one ends, in particular, from the bending portions to one ends on the viewer side.

1. Configuration of Light Diffusion Control Member

As previously described, the light diffusion control member 1 according to the present embodiment preferably includes the first light diffusion control layer 11 and the second light diffusion control layer 12. The form of the light diffusion control member 1 according to the present embodiment is not particularly limited, but may be preferably a film-like form, a plate-like form, or the like and may be particularly preferably a film-like form. The first light diffusion control layer 11 and the second light diffusion control layer 12 will be described below.

The light diffusion control layer 11, 12 in the present embodiment is not particularly limited, provided that it has a regular internal structure including the plurality of regions 111 having a relatively high refractive index in the region 112 having a relatively low refractive index, the regions 111 having a relatively high refractive index extend from one surface side to the other surface side of the light diffusion control layer 11, 12, and the straight line parallel to the extending direction is tilted with respect to the thickness direction of the light diffusion control layer 11, 12.

From the viewpoint of readily forming the regular internal structure as described above, the light diffusion control layer 11, 12 in the present embodiment may be preferably a layer obtained by curing a composition for light diffusion control layers that contains a high refractive index component and a low refractive index component having a refractive index lower than that of the high refractive index component. In particular, each of the high refractive index component and the low refractive index component may preferably have one or two polymerizable functional groups.

(1) High Refractive Index Component

Preferred examples of the above high refractive index component include (meth)acrylic ester that contains an aromatic ring, and (meth)acrylic ester that contains a plurality of aromatic rings may be particularly preferred. Examples of (meth)acrylic ester that contains a plurality of aromatic rings include those in which a part thereof is substituted with halogen, alkyl, alkoxy, alkyl halide, or the like, such as biphenyl (meth)acrylate, naphthyl (meth) acrylate, anthracyl (meth) acrylate, benzylphenyl (meth) acrylate, biphenyloxyalkyl (meth) acrylate, naphthyloxyalkyl (meth) acrylate, anthracyloxyalkyl (meth) acrylate, and benzylphenyloxyalkyl (meth) acrylate. Among these, biphenyl (meth)acrylate may be preferred from the viewpoint of readily forming a good regular internal structure. Specifically, o-phenylphenoxyethyl acrylate, o-phenylphenoxyethoxyethyl acrylate, or the like may be preferred. In the present specification, (meth)acrylic acid means both the acrylic acid and the methacrylic acid. The same applies to other similar terms.

The molecular weight (weight-average molecular weight) of the high refractive index component may be preferably 2,500 or less, particularly preferably 1,500 or less, and further preferably 1,000 or less. From another aspect, the molecular weight (weight-average molecular weight) of the high refractive index component may be preferably 150 or more, particularly preferably 200 or more, and further preferably 250 or more. When the molecular weight (weight-average molecular weight) of the high refractive index component falls within the above range, the light diffusion control layer 11, 12 having a desired regular internal structure can be readily formed. When the theoretical molecular weight of the above high refractive index component can be specified based on the molecular structure, the molecular weight (weight-average molecular weight) of the high refractive index component refers to the theoretical molecular weight (molecular weight that may not be the weight-average molecular weight). On the other hand, when it is difficult to specify the above-described theoretical molecular weight due to the above high refractive index component being a polymer component, for example, the molecular weight (weight-average molecular weight) of the high refractive index component refers to a weight-average molecular weight obtained as a standard polystyrene-equivalent value that is measured using a gel permeation chromatography (GPC) method. As used in the present specification, the weight-average molecular weight refers to a value that is measured as the standard polystyrene equivalent value using the GPC method.

The refractive index of the high refractive index component may be preferably 1.45 or more, more preferably 1.50 or more, particularly preferably 1.54 or more, and further preferably 1.56 or more. From another aspect, the refractive index of the high refractive index component may be preferably 1.70 or less, particularly preferably 1.65 or less, and further preferably 1.59 or less. When the refractive index of the high refractive index component falls within the above range, the light diffusion control layer 11, 12 having a desired regular internal structure can be readily formed. As used in the present specification, the refractive index means the refractive index of a certain component before curing the composition for light diffusion control layers, and the refractive index is measured in accordance with JIS K0062: 1992.

The content of the high refractive index component in the composition for light diffusion control layers may be preferably 25 mass parts or more, particularly preferably 40 mass parts or more, and further preferably 50 mass parts or more with respect to 100 mass parts of the low refractive index component. From another aspect, the content of the high refractive index component in the composition for light diffusion control layers may be preferably 400 mass parts or less, particularly preferably 300 mass parts or less, and further preferably 200 mass parts or less with respect to 100 mass parts of the low refractive index component. When the content of the high refractive index component falls within such ranges, the regions derived from the high refractive index component and the region derived from the low refractive index component exist with a desired ratio in the regular internal structure of the light diffusion control layer 11, 12 formed. As a result, the light diffusion control layer 11, 12 having a desired regular internal structure can be readily formed.

(2) Low Refractive Index Component

Preferred examples of the above low refractive index component include urethane (meth)acrylate, a (meth) acrylic-based polymer having a (meth)acryloyl group in a side chain, a (meth)acryloyl group-containing silicone resin, and an unsaturated polyester resin, but it may be particularly preferred to use urethane (meth)acrylate.

The above urethane (meth)acrylate may be preferably formed of (a) a compound that contains at least two isocyanate groups, (b) polyalkylene glycol, and (c) hydroxyalkyl (meth) acrylate.

Preferred examples of the above-described (a) compound that contains at least two isocyanate groups include aromatic polyisocyanates such as 2,4-tolylene diisocyanate, 2,6-tolylene diisocyanate, 1,3-xylylene diisocyanate, and 1,4-xylylene diisocyanate, aliphatic polyisocyanates such as hexamethylene diisocyanate, alicyclic polyisocyanates such as isophorone diisocyanate (IPDI) and hydrogenated diphenylmethane diisocyanate, biuret bodies and isocyanurate bodies thereof, and adduct bodies (e.g., a xylylene diisocyanate-based trifunctional adduct body) that are reaction products with low molecular active hydrogen-containing compounds such as ethylene glycol, propylene glycol, neopentyl glycol, trimethylol propane, and castor oil. Among these, an alicyclic polyisocyanate may be preferred, and an alicyclic diisocyanate that contains only two isocyanate groups may be particularly preferred.

Preferred examples of the above-described (b) polyalkylene glycol include polyethylene glycol, polypropylene glycol, polybutylene glycol, and polyhexylene glycol, among which polypropylene glycol may be preferred.

The weight-average molecular weight of the (b) polyalkylene glycol may be preferably 2,300 or more, particularly preferably 3,000 or more, and further preferably 4,000 or more. From another aspect, the weight-average molecular weight of the (b) polyalkylene glycol may be preferably 19,500 or less, particularly preferably 14,300 or less, and further preferably 12,300 or less.

Preferred examples of the above-described (c) hydroxyalkyl (meth)acrylate include 2-hydroxyethyl (meth)acrylate, 2-hydroxypropyl (meth)acrylate, 3-hydroxypropyl (meth) acrylate, 2-hydroxybutyl (meth) acrylate, 3-hydroxybutyl (meth)acrylate, and 4-hydroxybutyl (meth) acrylate.

Synthesis of the urethane (meth)acrylate using the above-described components (a) to (c) as the materials can be performed in a commonly-used method. In such a method, from the viewpoint of efficiently synthesizing the urethane (meth)acrylate, the compounding ratio of the components (a), (b), and (c) as the molar ratio may be preferably a ratio of 1-5:1:1-5 and particularly preferably a ratio of 1-3:1:1-3.

The weight-average molecular weight of the low refractive index component may be preferably 3,000 or more, particularly preferably 5,000 or more, and further preferably 7,000 or more. From another aspect, the weight-average molecular weight of the low refractive index component may be preferably 20,000 or less, particularly preferably 15,000 or less, and further preferably 13,000 or less. When the weight-average molecular weight of the low refractive index component falls within the above range, the light diffusion control layer 11, 12 having a desired regular internal structure can be readily formed.

The refractive index of the low refractive index component may be preferably 1.59 or less, more preferably 1.50 or less, particularly preferably 1.49 or less, and further preferably 1.48 or less. From another aspect, the refractive index of the low refractive index component may be preferably 1.30 or more, particularly preferably 1.40 or more, and particularly preferably 1.46 or more. When the refractive index of the low refractive index component falls within the above range, the light diffusion control layer 11, 12 having a desired regular internal structure can be readily formed.

(3) Other Components

The previously described composition for light diffusion control layers may contain other additives in addition to the high refractive index component and the low refractive index component. Examples of other additives include a multifunctional monomer (compound having three or more polymerizable functional groups), a photopolymerization initiator, an antioxidant, an ultraviolet absorber, a light stabilizer, an antistatic, a polymerization accelerator, a polymerization inhibitor, an infrared absorber, a plasticizer, a diluting solvent, and a leveling agent.

The composition for light diffusion control layers may preferably contain a photopolymerization initiator among the above-described additives. When the composition for light diffusion control layers contains a photopolymerization initiator, the light diffusion control layer 11, 12 having a desired regular internal structure can be readily and efficiently formed.

Examples of the photopolymerization initiator include benzoin, benzoin methyl ether, benzoin ethyl ether, benzoin isopropyl ether, benzoin-n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4-diethylaminobenzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminebenzoic ester, and oligo[2-hydroxy-2-methyl-1-[4-(1-methylvinyl)phenyl]propane]. These may each be used alone, or two or more types may also be used in combination.

When the photopolymerization initiator is used, the content of the photopolymerization initiator in the composition for light diffusion control layers may be preferably 0.2 mass parts or more, particularly preferably 0.5 mass parts or more, and further preferably 1 mass part or more with respect to 100 mass parts of the total amount of the high refractive index component and the low refractive index component. From another aspect, the content of the photopolymerization initiator may be preferably 20 mass parts or less, particularly preferably 15 mass parts or less, and further preferably 10 mass parts or less with respect to 100 mass parts of the total amount of the high refractive index component and the low refractive index component. When the content of the photopolymerization initiator in the composition for light diffusion control layers falls within the above range, the light diffusion control layer 11, 12 can be readily and efficiently formed.

The composition for light diffusion control layers may preferably contain an ultraviolet absorber. In the case where the composition for light diffusion control layers contains an ultraviolet absorber, when the coating film of the composition for light diffusion control layers is irradiated with active energy rays, the ultraviolet absorber selectively absorbs the active energy rays of predetermined wavelengths within a predetermined range. By optimizing the additive amount of the ultraviolet absorber, the regions 111 (columnar bodies) having a relatively high refractive index to be formed may be readily bent without inhibiting the curing of the composition for light diffusion control layers. As a result, the light diffusion control layer 11, 12 can achieve a wider angle range of light diffusion.

Examples of the ultraviolet absorber include benzotriazole-based ultraviolet absorbers, hydroxyphenyltriazine-based ultraviolet absorbers, benzophenone-based ultraviolet absorbers, and hydroxybenzoate-based ultraviolet absorbers, among which benzotriazole-based ultraviolet absorbers may be preferably used. One type of the above-described ultraviolet absorber may be used alone, or two or more types may also be used in combination.

When an ultraviolet absorber is used, the content of the ultraviolet absorber in the composition for light diffusion control layers may be preferably 0.001 mass parts or more, particularly preferably 0.01 mass parts or more, further preferably 0.03 mass parts or more, and most preferably 0.06 mass parts or more with respect to 100 mass parts of the total amount of the high refractive index component and the low refractive index component. From another aspect, the content of the ultraviolet absorber may be preferably 10 mass parts or less, particularly preferably 1 mass part or less, further preferably 0.5 mass parts or less, and most preferably 0.1 mass parts or less with respect to 100 mass parts of the total amount of the high refractive index component and the low refractive index component. The content within the above range of the ultraviolet absorber in the composition for light diffusion control layers allows the regions 111 (columnar bodies) having a relatively high refractive index to be effectively bent.

(4) Preparation of Composition for Light Diffusion Control Layers

The composition for light diffusion control layers can be prepared by uniformly mixing the previously described high refractive index component and low refractive index component and, if desired, other additives such as a photopolymerization initiator and a ultraviolet absorber.

In the above mixing, a uniform composition for light diffusion control layers may be obtained by stirring it while heating it to a temperature of 40° C. to 80° C. A diluting solvent may be added and mixed so that the obtained composition for light diffusion control layers has a desired viscosity.

(5) Regular Internal Structure of Light Diffusion Control Layer

As previously described, the light diffusion control layer 11, 12 in the present embodiment has a regular internal structure in its inside. The regular internal structure includes the plurality of regions 111 having a relatively high refractive index in the region 112 having a relatively low refractive index. In the light diffusion control layer 11, 12, the regions 111 having a relatively high refractive index may preferably extend from one surface side toward the other surface side of the light diffusion control layer 11, 12, and the straight line parallel to the extending direction of the regions 111 may be preferably tilted with respect to the thickness direction of the light diffusion control layer 11, 12.

A more specific example of the above-described regular internal structure may be a column structure configured such that, as illustrated in FIG. 3, a plurality of columnar bodies as the regions 111 having a relatively high refractive index is densely arranged to stand in the thickness direction of the light diffusion control layer 11, 12 in the region 112 having a relatively low refractive index. In the light diffusion control layer 11, 12 in the present embodiment, it may be preferred to have a column structure as the regular internal structure from the viewpoint of readily achieving the excellent visibility. FIG. 3 depicts the columnar bodies as existing in the entire thickness direction in the light diffusion control layer 11, 12, but the columnar bodies may not exist at least in one of the upper end part and lower end part of the light diffusion control layer 11, 12 in the thickness direction.

When the light incident on the light diffusion control layer 11, 12 having such a column structure falls within a predetermined incident angle range, the light exits the light diffusion control layer 11, 12 while being strongly diffused with a predetermined opening angle. On the other hand, when the incident light is at an angle that falls outside the above incident angle range, the incident light transmits through the light diffusion control layer 11, 12 without being diffused or exits the light diffusion control layer 11, 12 with weaker diffusion than that in the case of the incident light within the incident angle range. When an image creating body is arranged parallel to the surface of the light diffusion control layer 11, 12, the incident light within the above incident angle range is diffused due to the column structure, and the diffused light has a circular shape or an approximately circular shape (elliptical shape or the like) that spreads in any direction. On the other hand, in the case of the above weak diffusion due to the incident light outside the above incident angle range, the diffused light is in a crescent shape.

In the above column structure, the difference between the refractive index of the regions 111 (columnar bodies) having a relatively high refractive index and the refractive index of the region 112 having a relatively low refractive index may be preferably 0.01 or more, particularly preferably 0.05 or more, and further preferably 0.1 or more. When the above difference is 0.01 or more, effective diffusion can be performed. The upper limit of the above difference is not particularly limited and may be, for example, 0.3 or less.

Preferably, the above-described columnar bodies may have a structure in which the diameter increases from one surface to the other surface of the light diffusion control layer 11, 12. The columnar bodies having such a structure may readily change the traveling direction of light parallel to the extending direction of the columnar bodies as compared with columnar bodies in which the diameter does not substantially change from one surface to the other surface. This allows the light diffusion control layer 11, 12 to effectively diffuse light.

The maximum value of the diameter in the cross sections of the columnar bodies when the columnar bodies are cut along a horizontal plane with respect to the extending direction may be preferably 0.1 μm or more, particularly preferably 0.5 μm or more, and further preferably 1 μm or more. From another aspect, the maximum value may be preferably 15 μm or less, particularly preferably 10 μm or less, and further preferably 5 μm or less. When the maximum value of the diameter falls within the above range, the light diffusion control layer 11, 12 can effectively diffuse light. The shape of the cross sections of the columnar bodies when the columnar bodies are cut along a plane perpendicular to the extending direction of the columnar bodies is not particularly limited, but may be preferably, for example, a circle, an ellipse, a polygonal shape, an irregular shape, or other similar shape.

In the above-described column structure, the distance between adjacent columnar bodies may be preferably 0.1 μm or more, particularly preferably 0.5 μm or more, and further preferably 1 μm or more. From another aspect, the above distance may be preferably 15 μm or less, particularly preferably 10 μm or less, and further preferably 5 μm or less. When the distance between adjacent columnar bodies falls within the above range, the light diffusion control layer 11, 12 can effectively diffuse light.

The dimensions and other parameters relating to the regular internal structure of the column structure described above can be measured by observing the cross section of the column structure using an optical digital microscope.

The regular internal structure of the light diffusion control layer 11, 12 in the present embodiment may also be a structure obtained by modifying the above-described column structure. For example, the light diffusion control layer 11, 12 may preferably have, as the internal structure, a structure in which the columnar bodies in the above-described column structure are bent at the middle in the thickness direction of the light diffusion control layer 11, 12. This allows the light diffusion control layer 11, 12 to have a wider incident angle range in which the light diffusion is exhibited. Additionally or alternatively, the light diffusion control layer 11, 12 may have a column structure with two or more regions of columnar bodies having different tilt angles in the thickness direction of the light diffusion control layer 11, 12.

(6) Thickness of Light Diffusion Control Layer

The thickness of each of the light diffusion control layers 11 and 12 in the present embodiment may be preferably 30 μm or more, particularly preferably 40 μm or more, and further preferably 50 μm or more. From another aspect, the above thickness may be preferably 1,000 μm or less, particularly preferably 500 μm or less, further preferably 200 μm or less, and most preferably 80 μm or less. When the thickness of the light diffusion control layer 11, 12 falls within such a range, brighter display can be readily achieved, and the difference in the brightness of display can be more reduced when the up-down direction of the display content is changed.

2. Physical Properties of Light Diffusion Control Member

The light diffusion control member 1 according to the present embodiment may preferably exhibit the following optical characteristics when a reflective display body including the light diffusion control member 1 is irradiated with light rays.

Figure 6:
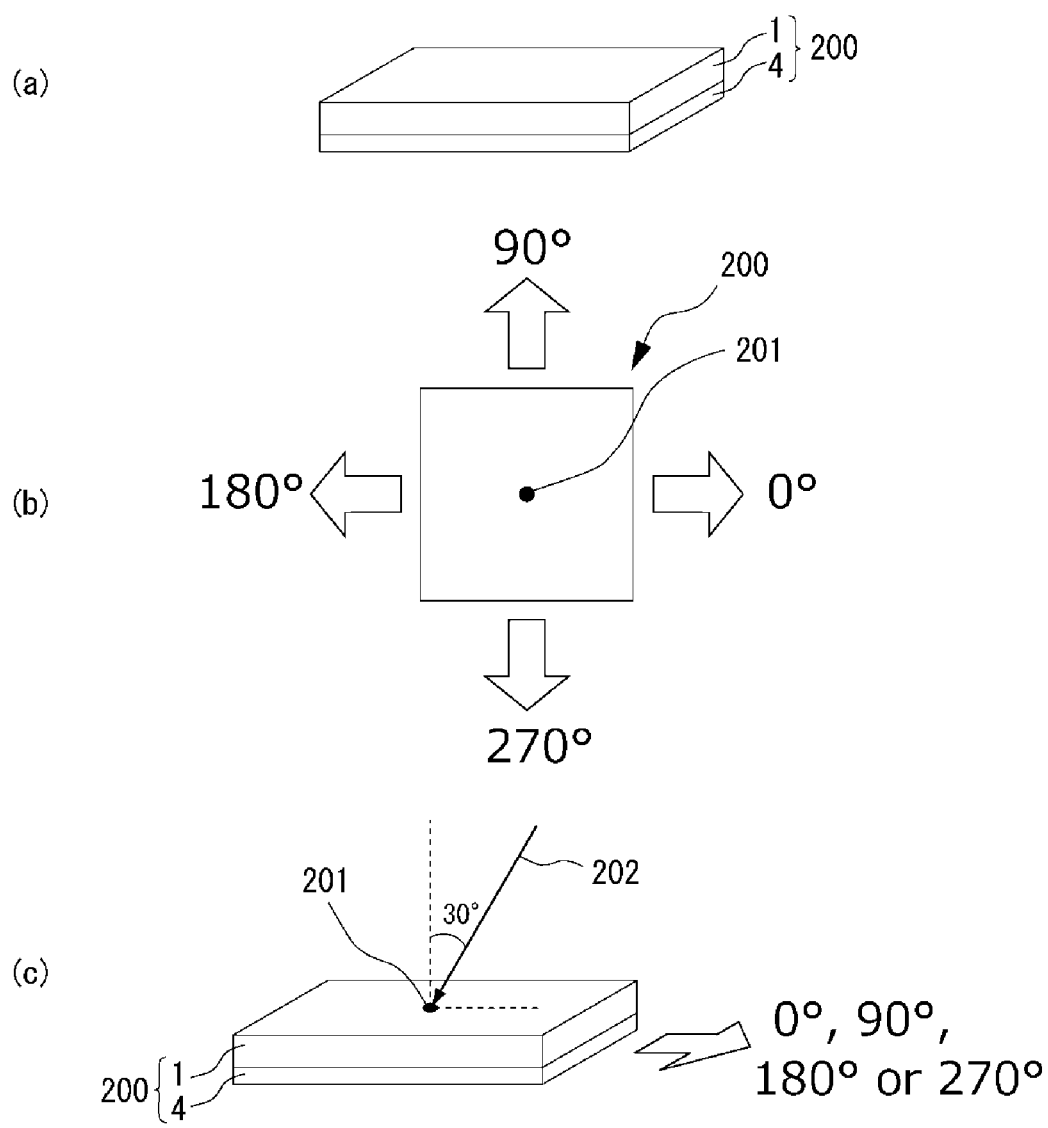
FIG. 6 is a set of diagrams for describing a method of measuring the optical properties of the light diffusion control member according to an embodiment of the present invention.

First, to study the above-described optical characteristics, the following measurement is performed. FIG. 6 illustrates steps of preparing a measurement sample and irradiating the obtained measurement sample with predetermined light rays. First, as illustrated in FIG. 6(a), a measurement sample 200 is prepared by laminating the light diffusion control member 1 on the reflective surface of a mirror 4. Subsequently, as illustrated in FIG. 6(b) (a diagram in which the measurement sample 200 is viewed in a plan view from a plane on the light diffusion control member 1 side), an arbitrary one point on the surface of the measurement sample 200 on the light diffusion control member 1 side is assumed to be an irradiation point 201, and four directions of orientation angles of 0°, 90°, 180°, and 270° are assumed around the above irradiation point 201. Then, as illustrated in FIG. 6(c), the irradiation point 201 is irradiated with light rays 202 from any of the above-described four orientation angles. The angle between the light rays 202 and the normal line of the surface on the light diffusion control member 1 is 30°.

Figure 7:
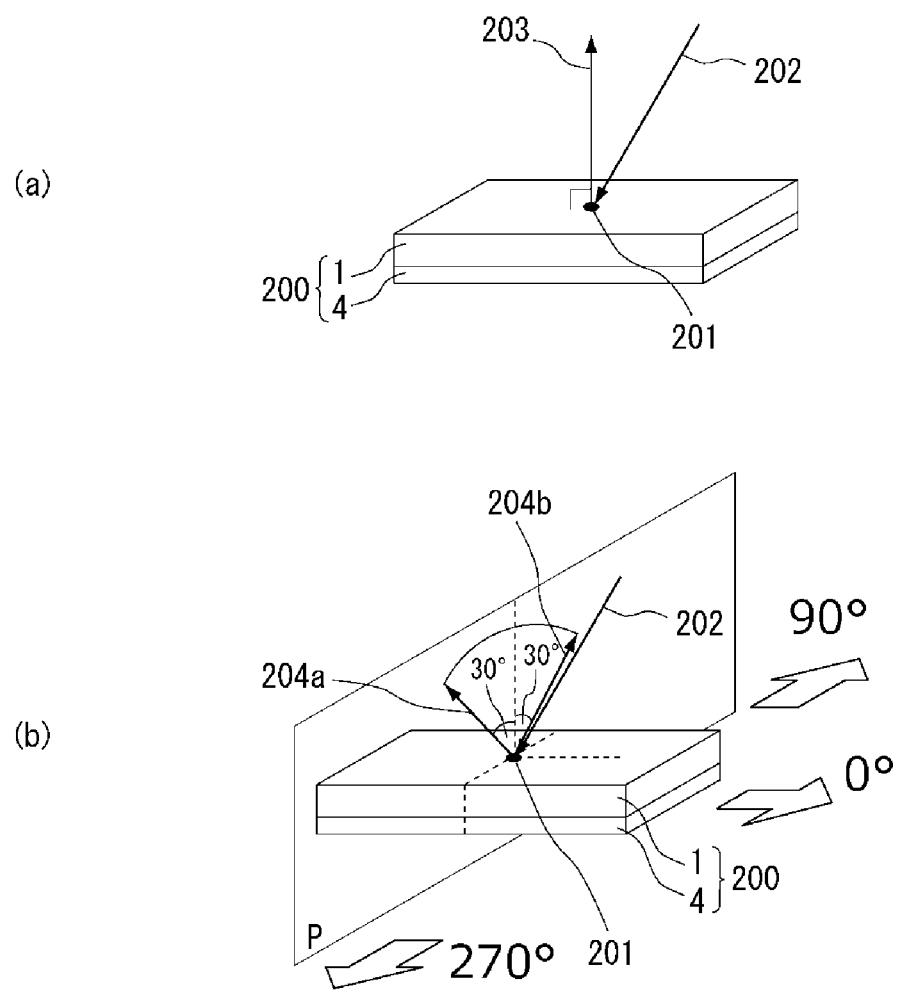
FIG. 7 is a set of diagrams for describing a method of measuring the optical properties of the light diffusion control member according to an embodiment of the present invention.

The incident light rays 202 are diffused and reflected by the measurement sample 200 thereby to cause reflected light. When acquiring the optical characteristics of the light diffusion control member 1, the luminance of a part of the caused reflected light is measured. There are two types of reflected light that are the objects of such measurement, and these will be described with reference to FIG. 7.

FIG. 7(a) illustrates the first measurement object. As illustrated in the figure, the reflected light caused by diffusion and reflection of the light rays 202 includes reflected light 203 directed from the irradiation point 201 in the normal direction (front direction) of the surface on the light diffusion control member 1 side. The reflected light 203 is a measurement object. Then, after measuring, at the above-described four orientation angles, respective luminance values ($cd/m^2$) of the reflected light 203 as the measurement object, the minimum luminance value among the four luminance values thus obtained is represented as $L_{min}$ while the maximum luminance value as $L_{max}$.

FIG. 7(b) illustrates the second measurement object. First, a plane P is assumed. As illustrated in the figure, the plane P includes the irradiation point 201 and the normal line of the surface on the light diffusion control member 1 side and is perpendicular to the orientation angle (0° in FIG. 7(b)) of irradiation with the light rays 202 (i.e., in FIG. 7(b), the plane P is parallel to the orientation angles of 90° and 270°). Then, in the reflected light caused by diffusion and reflection of the light rays 202, reflected light that travels in the above plane P and forms an angle of 30° or less with the above normal line is the measurement object (in FIG. 7(b), the reflected light is a set of reflected light beams that form a fan shape between a reflected light beam 204a and a reflected light beam 204b). Then, the standard deviation (cd/m²) of the luminance values of the reflected light beams is calculated, and its value is represented as $L_3$. As a result, $L_3$ is obtained in each of the above four directions.

The following measurement is also performed as a reference. That is, an arbitrary one point on one surface of any standard white plate is irradiated with light rays from the orientation angle at which the above $L_{min}$ is measured, and the luminance value (cd/m²) of reflected light obtained by diffusion and reflection from the above one point in the front direction is represented as $L_{STD}$. The angle between the light rays and the normal line of the one surface is 30°.

In the above cases, in the light diffusion control member 1 according to the present embodiment, $L_1$ represented by $L_1=L_{min}/L_{STD}$ may preferably satisfy the following expression (1).

$$L_1 > 1.00 \quad (1)$$

In the case of satisfying the above expression (1), even when the luminance is the lowest ($L_{min}$), a higher luminance is obtained than the luminance ($L_{STD}$) at the time of diffusion (Lambertian diffusion) occurring on the standard white plate. In a reflective display body incorporating the light diffusion control member 1, therefore, a brighter display can be readily achieved by using the light emitted from various orientation angles to the display surface. From this viewpoint, $L_1$ may be particularly preferably 1.30 or more, further preferably 1.80 or more, and most preferably 1.95 or more. The upper limit of $L_1$ is not particularly limited and may be, for example, 4.00 or less and particularly 2.50 or less.

Additionally or alternatively, in the light diffusion control member 1 according to the present embodiment, $L_2$ represented by $L_2=L_{min}/L_{max}$ may preferably satisfy the following expression (2).

$$0.6 \leq L_2 \leq 1.00 \quad (2)$$

In the case of satisfying the above expression (2), the difference between when the luminance is the lowest ($L_{min}$) and when the luminance is the highest ($L_{max}$) is relatively small. In a reflective display body incorporating the light diffusion control member 1, therefore, even when the reflective display body is turned on its side to change the positional relationship between the display surface and the external light source, for example, the variation in the brightness of display can be suppressed to readily achieve the display with uniform brightness. From this viewpoint, $L_2$ may be particularly preferably 0.65 or more, further preferably 0.72 or more, and most preferably 0.78 or more. The upper limit of $L_2$ is not particularly limited, provided that it is 1.00 or less, but from the viewpoint of readily achieving both $L_2$ and $L_3$, which is described below, the upper limit of $L_2$ may be particularly preferably 0.98 or less and further preferably 0.89 or less.

Additionally or alternatively, the light diffusion control member 1 according to the present embodiment may preferably satisfy the following expression (3) in all the above four directions.

$$L_3 < 2.00 \quad (3)$$

In the case of satisfying the above expression (3), regardless of the direction of irradiation with light, a reflective display body incorporating the light diffusion control member 1 can diffuse and reflect uniform light toward the horizontal direction for the viewer. The viewer can therefore visually recognize the display with substantially the same luminance for the right eye and the left eye and is less likely to recognize the unevenness of the brightness. From this viewpoint, $L_3$ may be particularly preferably 1.5 or less and further preferably 1.1 or less. The lower limit of $L_3$ is not particularly limited and may be, for example, 0.1 or more and particularly 0.4 or more. When the reflective display body 100 including the light diffusion control member 1 is used for display such that the orientation angle of 270° is on the ground side, the irradiation light 202 from the orientation angle of 270° corresponds to the irradiation light from the ground side; therefore, even when $L_3$ at the orientation angle of 270° is a relatively high value, the effect on the visibility is usually small.

Details of the above-described measurement methods for the luminance are as described in Testing Examples, which will be described later.

3. Method of Manufacturing Light Diffusion Control Member

The method of manufacturing the light diffusion control member 1 according to the present embodiment is not particularly limited, and the light diffusion control member 1 can be manufactured using a conventional manufacturing method. For example, the light diffusion control member 1 can be obtained through producing the first light diffusion control layer 11 and the second light diffusion control layer 12 and laminating them so as to satisfy the condition for the previously described angle "b" while taking into account the direction of the previously described vector C.

The method of manufacturing the light diffusion control layer 11, 12 is not particularly limited, and the light diffusion control layer 11, 12 can be formed using a conventionally known method. For example, one surface of a process sheet may be coated with the previously described composition for light diffusion control layers to form a coating film, and one surface of a release sheet (in particular, the release surface) is then attached to the surface of the coating film opposite to the process sheet. Subsequently, the above coating film is irradiated with active energy rays via the process sheet or the release sheet to cure the coating film, and the light diffusion control layer 11, 12 can thereby be formed. Thus, by laminating the release sheet on the above coating film, the light diffusion control layer 11, 12 having a uniform thickness can readily be formed while maintaining the gap between the release sheet and the process sheet and suppressing the crushing of the coating film.

Examples of the method for the above-described coating include a knife coating method, a roll coating method, a bar coating method, a blade coating method, a die coating method, and a gravure coating method. The composition for light diffusion control layers may be diluted using a solvent as necessary.

Irradiation of the coating film with the active energy rays may be performed in a different mode depending on the regular internal structure to be formed. Such irradiation can be performed using a conventionally known method. For example, when forming the previously described column structure, the coating film may be irradiated with parallel light having a high degree of parallelism of light rays.

The above active energy rays refer to electromagnetic wave or charged particle radiation having an energy quantum, and specific examples of the active energy rays include ultraviolet rays and electron rays. Among the active energy rays, ultraviolet rays may be particularly preferred because of easy management.

When forming the column structure using ultraviolet rays as the active energy rays, it may be preferred to set the irradiation condition such that the peak illuminance on the coating film surface is 0.1 to 10 mW/cm². The peak illuminance as referred to herein means a measured value at a portion at which the active energy rays irradiating the coating film surface give the maximum value. Additionally or alternatively, it may be preferred to set the integrated light amount on the coating film surface to 5 to 200 mJ/cm².

From the viewpoint of completing more reliable curing, it may also be preferred to perform the irradiation with commonly-used active energy rays (active energy rays for which the process of converting the rays into parallel light or strip-shaped light is not performed, scattered light) after performing the curing using the parallel light or strip-shaped light as previously described.

4. Reflective Display Body

As previously described, the light diffusion control member 1 according to the present embodiment can be suitably used for manufacturing the reflective display body 100. The reflective display body 100 may preferably include, for example, the above-described light diffusion control member 1, the display device 2 provided on one surface side of the light diffusion control member 1, and the reflective layer 3 provided on a surface side of the display device 2 opposite to the light diffusion control member 1 or incorporated in the display device 2.

The reflective display body 100 includes the light diffusion control member 1 according to the present embodiment and can thereby achieve excellent visibility as described previously. In particular, even when the up-down direction of display content is changed, the display with uniform brightness can be achieved, and the reflective display body 100 may therefore be preferably configured such that the up-down direction of display content on the display surface can be changed.

When manufacturing the reflective display body 100 using the light diffusion control member 1 according to the present embodiment, at least in one of the first light diffusion control layer 11 and the second light diffusion control layer 12 which constitute the light diffusion control member 1, vectors (vector $C_1$ and vector $C_2$ of FIG. 5) obtained by projecting, onto the first surface 101, vectors that are parallel to the extending direction of the regions 111 having a relatively high refractive index and that are directed from the second surface 102 side toward the first surface side 101 may preferably satisfy the following condition. That is, when the downward direction of an initial up-down direction of display content is 0°, the light diffusion control member 1 may be preferably laminated in the reflective display body 100 so that at least one of the directions of the above vector $C_1$ and vector $C_2$ (preferably, both directions of the vectors) falls within a range of −90° to 90°. This will be described with reference to the orientation angles of FIG. 6(b). When the downward direction of the initial up-down direction of display content coincides with the orientation angle of 270°, the light diffusion control member 1 may be preferably laminated in the reflective display body 100 so that at least one of the orientations of the above vector $C_1$ and vector $C_2$ (preferably, both orientations of the vectors) falls within a range of 180° to 0° (360°). Such a configuration allows the bright display to be more readily ensured except when the reflective display body 100 is rotated by 180°.

The above-described "initial up-down direction" refers to the up-down direction as a reference when the reflective display body 100 is used. Usually, the up-down direction as such a reference is selected based on a primary up-down direction of display content (for example, an up-down direction that is most adopted, an up-down direction that coincides with the up-down direction of the operation unit of the display device, or the like). From the same viewpoint, the "initial right-left direction" refers to the right-left direction as a reference.

The shape of the display surface of the reflective display body 100 is not particularly limited, but typically, the display surface may preferably have a rectangular shape. In this case, the display surface may be a rectangle composed of a pair of long sides and a pair of short sides or may also be a square whose all sides have the same length. When the display surface has such a rectangular shape, the display surface may be preferably configured such that the up-down direction of the display content can take a direction parallel to a side of the above rectangle and a direction perpendicular to that direction. Additionally or alternatively, the shape of the display surface may be a quadrangular shape other than a rectangular shape, such as a diamond shape, a trapezoidal shape, or a parallelogram, a circular shape such as a perfect circle or an ellipse, or an irregular shape other than these.

(1) Display Device

The above display device 2 is not particularly limited and may be a display device incorporated in a general reflective display body. Examples of the display device 2 include liquid crystal displays, organic EL displays, electronic paper, electrophoresis displays, MEMS displays, and solid crystal displays, and the display device 13 may also be obtained by laminating a touch panel on any of these displays.

(2) Reflective Layer

The above reflective layer 3 is not particularly limited and may be any of reflective layers used for general reflective display bodies. Preferred examples of the reflective layer 3 include a metal vapor-deposited film obtained by vapor-depositing a metal on a given surface. Preferred examples of such a metal include aluminum, silver, and nickel.

The thickness of the reflective layer 3 made of the above-described metal vapor-deposited film is not particularly limited, but may be preferably, for example, 1 nm or more, particularly preferably 10 nm or more, and further preferably 50 nm or more. From another aspect, the above thickness may be preferably 3 µm or less, particularly preferably 1 µm or less, and further preferably 400 nm or less.

The reflective layer 3 made of the above-described metal vapor-deposited film may be provided on the surface of a resin film as a support body. Examples of such a resin film for use include polyethylene terephthalate films, polyethylene naphthalate films, polybutylene terephthalate films, polyethylene films, polypropylene films, polybutene films, polybutadiene films, polymethylpentene films, polyvinyl chloride films, vinyl chloride copolymer films, polyurethane films, ethylene vinyl acetate films, ionomer resin films, ethylene/(meth)acrylic acid copolymer films, ethylene/(meth)acrylic ester copolymer films, polystyrene films, polycarbonate films, polyimide films, fluorine resin films, and liquid crystal polymer films. Crosslinked films of these films may also be used. The resin film may also be a laminated film of these films.

The above reflective layer 3 may be a reflective electrode. In this case, the reflective electrode may be incorporated, for example, in the display device 2. In general, the reflective electrode is not provided to cover the entire display surface of the reflective display body 100, and there is a portion on which the electrode is not formed. In the reflective display body 100 including a reflective electrode, therefore, external light can be reflected by the reflective electrode, while on the other hand, light from a backlight or the like provided on the back surface of the display device 2 can be transmitted through the portion on which the electrode is not formed. The material of the reflective electrode as the above reflective layer 3 is not particularly limited, and the reflective electrode can be formed of a general material for reflective electrodes.

In the reflective display body 100 illustrated in FIG. 2, the reflective layer 3 is drawn as a component independent of the display device 2 and is also drawn so as to exist in the entire area in the lateral direction (the entire area of the surface of the display device 2 opposite to the light diffusion control member 1). However, the reflective display body 100 according to the present embodiment is not limited to the display body illustrated in FIG. 2 and encompasses a display body that includes the above-described reflective electrode as the reflective layer 3.

The above reflective layer 3 may also be a reflective layer having semi-transmissive and semi-reflective properties that exhibits both a property of transmitting light and a property of reflecting light.

(3) Other Constitutional Members

The reflective display body 100 may include one or more constitutional members other than the above-described light diffusion control body 1, display device 2, and reflective layer 3. For example, a surface coat layer, a cover panel, or the like may be provided on the surface side of the light diffusion control member 1 opposite to the display device 2. Additionally or alternatively, a backlight may be provided on the surface side of the display device 2 opposite to the light diffusion control member 1.

(4) Method of Manufacturing Reflective Display Body

The method of manufacturing the reflective display body 100 is not particularly limited, and the reflective display body 100 can be manufactured using a conventional manufacturing method. For example, when manufacturing the reflective display body 100 illustrated in FIG. 2, the reflective display body 100 can be obtained through manufacturing the light diffusion control member 1, the display device 2, and the reflective layer 3 and then laminating them.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

EXAMPLES

Hereinafter, the present invention will be described further specifically with reference to examples etc., but the scope of the present invention is not limited to these examples etc.

<Production Example 1> (Light Diffusion Control Layer A)

(1) Preparation of Composition for Light Diffusion Control Layers

Polyether urethane methacrylate having a weight-average molecular weight of 9,900 was obtained as the low refractive index component by reacting polypropylene glycol, isophorone diisocyanate, and 2-hydroxyethyl methacrylate. A composition for light diffusion control layers was obtained through adding 60 mass parts (solid content equivalent value, here and hereinafter) of o-phenylphenoxyethoxyethyl acrylate having a molecular weight of 268 as the high refractive index component, 8 mass parts of 2-hydroxy-2-methyl-1-phenylpropan-1-one as the photopolymerization initiator, and 0.08 mass parts of a benzotriazole-based ultraviolet absorber (available from BSF, product name "TINUVIN 384-2") as the UV absorber to 40 mass parts of the above low refractive index component and then heating and mixing them under a condition of 80° C.

(2) Formation of Light Diffusion Control Layer

One surface of a long polyethylene terephthalate sheet as the process sheet was coated with the obtained composition for light diffusion control layers to form a coating film. Subsequently, the release surface of a release sheet (available from LINTEC Corporation, product name "SP-PLZ383030," thickness: 38 μm) obtained by release-treating one surface of a polyethylene terephthalate with a silicone-based release agent was laminated on the surface of the coating film opposite to the process sheet.

The laminate thus obtained and composed of the release sheet, the above coating film, and the process sheet was placed on a conveyor. At that time, the surface of the laminate on the release sheet side was on the upper side, and the longitudinal direction of the laminate was made parallel to the flow direction of the conveyor. Then, an ultraviolet spot parallel light source (available from JATEC) having a controlled center beam parallelism within ±3° was installed on the conveyor on which the laminate was placed. At that time, the light source was installed so as to be able to emit parallel light in a direction tilted by 5° in the flow direction of the conveyor with respect to the normal direction of the surface of the laminate on the coating film side.

Thereafter, while the conveyor was operated to move the laminate, the coating film in the laminate was cured by being irradiated with parallel light having a parallelism of 2° or less (UV light from a high-pressure mercury lamp having a main peak at a wavelength of 365 nm and other peaks at 254 nm, 303 nm, and 313 nm) under the conditions of a peak illuminance of 1.02 mW/cm$^2$ and an integrated light amount of 26.35 mJ/cm$^2$ on the coating film surface, and a light diffusion control layer A having a thickness of 110 μm was thus formed. As a result, a laminate was obtained in which the process sheet, the light diffusion control layer A (thickness: 110 μm), and the release sheet were laminated in this order.

When the cross section of the formed light diffusion control layer A was observed with a microscope and the like, it was confirmed that a column structure in which a plurality of columnar bodies was densely arranged to stand in the entire thickness direction was formed in the light diffusion control layer A. That is, the ratio of the column structure region extending in the thickness direction inside the obtained light diffusion control layer A was 100%. Confirmation was conducted for the direction C of FIG. 4 in the light diffusion control layer A, and it was also confirmed that when the ultraviolet irradiation surface was on the upper side, the conveyor traveling direction (MD direction) and the direction C coincided with each other. It was further confirmed that the above columnar bodies were bent in the middle of the extending direction. In the portions of the above-described columnar bodies on the ultraviolet irradiation surface side of the bent portions, it was also confirmed that the angle (angle "a" in FIG. 4) between the extending direction (direction A in FIG. 4) and the thickness direction (direction B in FIG. 4) of the light diffusion control layer A was 3.2°. In the present specification, the angle is indicated as a positive value when the direction A is tilted in the conveyor traveling direction (MD direction) with respect to the direction B, while the angle is indicated as a negative value when the direction A is tilted in the opposite direction to the conveyor traveling direction.

The above-described peak illuminance and integrated light amount were measured using a UV METER (available from EYE GRAPHICS CO., LTD., product name "EYE Ultraviolet Integrated Illuminance Meter UVPF-A1") equipped with a light receiver and installed for the position of the above coating film. The thickness of the light diffusion control layer A was measured using a constant-pressure thickness meter (available from TAKARA SEISAKUSYO, product name "Teclock PG-02J").

<Production Example 2> (Light Diffusion Control Layer B)

A laminate in which the process sheet, a light diffusion control layer B (thickness: 60 μm), and the release sheet were laminated in this order was obtained in the same manner as in Production Example 1 except that the light diffusion control layer was formed to have a thickness of 60 μm.

When the cross section of the formed light diffusion control layer B was observed with a microscope and the like, it was confirmed that a column structure in which a plurality of columnar bodies was densely arranged to stand in the entire thickness direction was formed in the light diffusion control layer B. That is, the ratio of the column structure region extending in the thickness direction inside the obtained light diffusion control layer B was 100%. Confirmation was conducted for the direction C of FIG. 4 in the light diffusion control layer B, and it was also confirmed that when the ultraviolet irradiation surface was on the upper side, the conveyor traveling direction (MD direction) and the direction C coincided with each other. It was further confirmed that the above columnar bodies were bent in the middle of the extending direction. In the portions of the above-described columnar bodies on the ultraviolet irradiation surface side of the bent portions, it was also confirmed that the angle (angle "a" in FIG. 4) between the extending direction (direction A in FIG. 4) and the thickness direction (direction B in FIG. 4) of the light diffusion control layer B was 3.2°.

<Production Example 3> (Light Diffusion Control Layer C)

A laminate in which the process sheet, a light diffusion control layer C (thickness: 60 μm), and the release sheet were laminated in this order was obtained in the same manner as in Production Example 2 except that a composition for light diffusion control layers in which no ultraviolet absorber was added was used and the irradiation angle of parallel light from the ultraviolet spot parallel light source was changed.

When the cross section of the formed light diffusion control layer C was observed with a microscope and the like, it was confirmed that a column structure in which a plurality of columnar bodies was densely arranged to stand in the entire thickness direction was formed in the light diffusion control layer C. That is, the ratio of the column structure region extending in the thickness direction inside the obtained light diffusion control layer C was 100%. Confirmation was conducted for the direction C of FIG. 4 in the light diffusion control layer C, and it was also confirmed that when the ultraviolet irradiation surface was on the upper side, the conveyor traveling direction (MD direction) and the direction C coincided with each other. It was further confirmed that the angle (angle "a" in FIG. 4) between the extending direction (direction A in FIG. 4) of the above-described columnar bodies and the thickness direction (direction B in FIG. 4) of the light diffusion control layer C was 6.4°.

<Production Example 4> (Light Diffusion Control Layer D)

A laminate in which the process sheet, a light diffusion control layer D (thickness: 60 μm), and the release sheet were laminated in this order was obtained in the same manner as in Production Example 2 except that a composition for light diffusion control layers in which no ultraviolet absorber was added was used and the irradiation angle of parallel light from the ultraviolet spot parallel light source was changed.

When the cross section of the formed light diffusion control layer D was observed with a microscope and the like, it was confirmed that a column structure in which a plurality of columnar bodies was densely arranged to stand in the entire thickness direction was formed in the light diffusion control layer D. That is, the ratio of the column structure region extending in the thickness direction inside the obtained light diffusion control layer D was 100%. Confirmation was conducted for the direction C of FIG. 4 in the light diffusion control layer D, and it was also confirmed that when the ultraviolet irradiation surface was on the upper side, the conveyor traveling direction (MD direction) and the direction C coincided with each other. It was further confirmed that the angle (angle "a" in FIG. 4) between the extending direction (direction A in FIG. 4) of the above-described columnar bodies and the thickness direction (direction B in FIG. 4) of the light diffusion control layer D was 9.6°.

Details of the light diffusion control layers A to D thus produced are summarized in Table 1.

Example 1

The process sheet and the release sheet were released and removed from the laminate produced in Production Example 1 to obtain the light diffusion control layer A, and this was used as the first light diffusion control layer. In addition, the light diffusion control layer A was obtained from the laminate produced in Production Example 1 in the same manner as above, and this was used as the second light diffusion control layer. Then, the surface of the above second light diffusion control layer irradiated with ultraviolet rays was laminated on the surface of the above first light diffusion control layer opposite to the surface irradiated with ultraviolet rays. In this lamination, the direction C in FIG. 4 (related to the MD direction as described previously) was adjusted and the lamination was performed so that the angle "b" in FIG. 5 would be 90°. A light diffusion control member was thus obtained.

Subsequently, a mirror (available from JDSU, product name "BV2 mirror") was prepared. It is assumed that the up-down and right-left directions are defined when the mirror surface is viewed in a plan view. Specifically, with reference to the center of the mirror surface, the rightward direction is set to an orientation angle of 0°, the upward direction is set to an orientation angle of 90°, the leftward direction is set to an orientation angle of 180°, and the downward direction is set to an orientation angle of 270°. Then, the surface of the above light diffusion control member on the second light diffusion control layer side was laminated on the mirror surface of the mirror. At that time, the lamination was performed so that the direction C in FIG. 4 of the second light diffusion control layer of the above light diffusion control member and the orientation angle of 270° on the mirror would coincide with each other. In this case, the direction C in FIG. 4 of the first light diffusion control layer coincides with the orientation angle of 0° on the mirror. A reflective display body sample was thus obtained.

Example 2

After a light diffusion control member was obtained in the same manner as in Example 1 except that the first light diffusion control layer and the second light diffusion control layer were both substituted with the light diffusion control layers B produced in Production Example 2, a reflective display body sample was obtained.

Example 3

After a light diffusion control member was obtained in the same manner as in Example 2 except that the first light diffusion control layer and the second light diffusion control layer were laminated so that the angle "b" in FIG. 5 would be 30°, a reflective display body sample was obtained. In the reflective display body sample, the direction C in FIG. 4 of the first light diffusion control layer coincides with the orientation angle of 300° on the mirror.

Example 4

After a light diffusion control member was obtained in the same manner as in Example 2 except that the first light diffusion control layer and the second light diffusion control layer were laminated so that the angle "b" in FIG. 5 would be 45°, a reflective display body sample was obtained. In the reflective display body sample, the direction C in FIG. 4 of the first light diffusion control layer coincides with the orientation angle of 315° on the mirror.

Example 5

After a light diffusion control member was obtained in the same manner as in Example 2 except that the first light diffusion control layer and the second light diffusion control layer were laminated so that the angle "b" in FIG. 5 would be 60°, a reflective display body sample was obtained. In the reflective display body sample, the direction C in FIG. 4 of the first light diffusion control layer coincides with the orientation angle of 330° on the mirror.

Example 6

After a light diffusion control member was obtained in the same manner as in Example 1 except that the first light diffusion control layer and the second light diffusion control layer were both substituted with the light diffusion control layers C produced in Production Example 3, a reflective display body sample was obtained.

Comparative Example 1

The process sheet and the release sheet were released and removed from the laminate produced in Production Example 1 to obtain the light diffusion control layer A, and a single layer of this light diffusion control layer A was used as the light diffusion control member.

Subsequently, the surface of the light diffusion control layer A, constituting the above light diffusion control member, opposite to the surface irradiated with ultraviolet rays was laminated on the mirror surface of a mirror (available from JDSU, product name "BV2 mirror"). At that time, the lamination was performed so that the direction C in FIG. 4 of the light diffusion control layer A constituting the above light diffusion control member and the orientation angle of 270° on the mirror would coincide with each other. A reflective display body sample was thus obtained.

Comparative Example 2

The process sheet and the release sheet were released and removed from the laminate produced in Production Example 1 to obtain the light diffusion control layer A, and a single layer of this light diffusion control layer A was used as the light diffusion control member.

Subsequently, the surface of the light diffusion control layer A, constituting the above light diffusion control member, opposite to the surface irradiated with ultraviolet rays was laminated on the mirror surface of a mirror (available from JDSU, product name "BV2 mirror"). At that time, the lamination was performed so that the direction C in FIG. 4 of the light diffusion control layer A constituting the above light diffusion control member would coincide with the orientation angle of 315° on the mirror. A reflective display body sample was thus obtained.

Comparative Example 3

The process sheet and the release sheet were released and removed from the laminate produced in Production Example 4 to obtain the light diffusion control layer D, and a single layer of this light diffusion control layer D was used as the light diffusion control member.

Subsequently, the surface of the light diffusion control layer D, constituting the above light diffusion control member, opposite to the surface irradiated with ultraviolet rays was laminated on the mirror surface of a mirror (available from JDSU, product name "BV2 mirror"). At that time, the lamination was performed so that the direction C in FIG. 4 of the light diffusion control layer D constituting the above light diffusion control member and the orientation angle of 270° on the mirror would coincide with each other. A reflective display body sample was thus obtained.

<Testing Examples> (Measurement of Luminance)

(1) For the reflective display body sample produced in each of Examples and Comparative Examples, as illustrated in FIG. 6(b), one point on the surface (irradiation surface) on the light diffusion control member side was assumed to be an irradiation point (in FIG. 6(b), a point denoted by reference numeral 201) and four directions of orientation angles of 0°, 90°, 180°, and 270° were assumed around the irradiation point. Such a reflective display body sample was installed in a conoscope (available from Acoustic Melcher) and, in the reflection mode, the above irradiation point was irradiated with light rays to measure the luminance distribution of the reflected light thus diffused and reflected. At that time, as illustrated in FIG. 6(c), the above light rays were emitted from each of the above-described four orientation angles so that the angle between the above light rays and the normal line of the above surface of the reflective display body sample would be 30°. Thus, the luminance distribution was measured at each orientation angle.

In addition, the reflective display body sample was substituted with a standard white plate, and the luminance distributions were measured at the four types of orientation angles under the same condition as above.

(2) From each of the four types of luminance distributions measured for the above-described reflective display body sample, the luminance (cd/m²) of the reflected light (light rays denoted by reference numeral 203 in FIG. 7(a)) reflected in the front direction (direction parallel to the normal line of one surface of the above reflective display body sample) was read. Then, the minimum luminance value among the four types of luminance values thus obtained was represented as $L_{min}$ while the maximum luminance value as $L_{max}$.

In addition, from the luminance distribution measured at the same orientation angle as the orientation angle giving the above-described minimum luminance $L_{min}$ in the four types of luminance distributions measured for the above-described standard white plate, the luminance of the reflected light reflected in the front direction was read, and this was represented as $L_{STD}$.

(3) Using the values of $L_{min}$, $L_{max}$, and $L_{STD}$ thus specified, $L_1$ and $L_2$ were calculated from the following equations. These values (cd/m²) are listed in Table 2.

luminance distribution at the orientation angle of 0°, and the standard deviation (cd/m²) of the luminance values was calculated and represented as $L_3$.

Also for the cases of irradiation with light rays from the orientation angles of 90°, 180°, and 270°, the plane was assumed in the same manner as above and the standard deviation $L_3$ was calculated.

The values of $L_3$ at the four orientation angles thus obtained are listed in Table 2.

TABLE 1

| | Angle (angle a) (°) between extending direction of columnar bodies and thickness direction of light diffusion control layer | Presence or absence of bend | Thickness (μm) |
|---|---|---|---|
| Light diffusion control layer A | 3.2 | Present | 110 |
| Light diffusion control layer B | 3.2 | Present | 60 |
| Light diffusion control layer C | 6.4 | Absent | 60 |
| Light diffusion control layer D | 9.6 | Absent | 60 |

TABLE 2

| | Layer configuration of light diffusion control film | First light diffusion control layer | Second light diffusion control layer | Angle b (°) | $L_1$ (cd/m²) | $L_2$ (cd/m²) | $L_3$ (cd/m²) | | | |
|---|---|---|---|---|---|---|---|---|---|---|
| | | Orientation angle (°) of mirror coincident with direction C | | | | | 0° | 90° | 180° | 270° |
| Example 1 | Light diffusion control layer A/ Light diffusion control layer A | 0 | 270 | 90 | 1.93 | 0.79 | 0.77 | 0.63 | 0.59 | 1.51 |
| Example 2 | Light diffusion control layer B/ Light diffusion control layer B | 0 | 270 | 90 | 1.97 | 0.79 | 0.70 | 0.89 | 1.03 | 1.68 |
| Example 3 | Light diffusion control layer B/ Light diffusion control layer B | 330 | 270 | 60 | 2.24 | 0.88 | 0.55 | 1.28 | 1.68 | 0.79 |
| Example 4 | Light diffusion control layer B/ Light diffusion control layer B | 315 | 270 | 45 | 2.01 | 0.74 | 0.94 | 1.47 | 1.36 | 1.26 |
| Example 5 | Light diffusion control layer B/ Light diffusion control layer B | 300 | 270 | 30 | 1.90 | 0.74 | 0.53 | 0.88 | 0.79 | 1.35 |
| Example 6 | Light diffusion control layer C/ Light diffusion control layer C | 0 | 270 | 90 | 1.86 | 0.68 | 0.97 | 0.97 | 0.70 | 1.46 |
| Comparative Example 1 | Single layer of light diffusion control layer A | 270 | | — | 1.89 | 0.76 | 2.11 | 2.35 | 1.64 | 1.67 |
| Comparative Example 2 | Single layer of light diffusion control layer A | 315 | | — | 2.61 | 0.90 | 1.65 | 2.32 | 3.22 | 2.67 |
| Comparative Example 3 | Single layer of light diffusion control layer D | 270 | | — | 1.15 | 0.25 | 3.12 | 11.16 | 2.15 | 2.54 |

$$L_1 = L_{min}/L_{STD}$$

$$L_2 = L_{min}/L_{max}$$

(4) As illustrated in FIG. 7(b), a plane (plane P in FIG. 7(b)) was assumed for the case in which the irradiation point of the above reflective display body sample was irradiated with light rays from the direction of the orientation angle of 0°. The plane includes the irradiation point and the normal line of the irradiation surface and is perpendicular to the orientation angle of 0° (i.e., the plane is parallel to the orientation angles of 90° and 270°). Then, the luminance values of the reflected light traveling in the above-described plane and forming an angle of 30° or less with the above normal line of the irradiation surface were read from the As listed in Table 2, in the reflective display body samples according to Examples, $L_1 > 1.00$ and it is found that regarding the brightness in the front direction, a brighter display can be achieved than the case of ordinary diffuse reflection (Lambertian reflection). Moreover, in the reflective display body samples according to Examples, $0.6 \leq L_2 \leq 1.00$ and it is found that even when the reflective display body is rotated from the vertical posture to the horizontal posture, for example, the variation in the brightness is less likely to occur. Furthermore, in the reflective display body samples according to Examples, $L_3 < 2.00$ at all the four orientation angles and it is found that even when light is received from any of the four directions, the display can be achieved with uniform brightness toward the horizontal direction for the viewer. As described above, it is found that the reflective display body samples according to Examples have excellent visibility.

INDUSTRIAL APPLICABILITY

The light diffusion control member of the present invention is suitably used for manufacturing a display body of a smartphone, a tablet, or the like which is configured such that the up-down direction of the display content can be changed.

DESCRIPTION OF REFERENCE NUMERALS

1 Light diffusion control member
  11 First light diffusion control layer
  12 Second light diffusion control layer
  101 First surface
  102 Second surface
  111 Regions (columnar bodies) having a relatively high refractive index
  112 Region having a relatively low refractive index
2 Display device
3 Reflective layer
4 Mirror
100 Reflective display body
200 Measurement sample
201 Irradiation point
202 Light rays
203, 204a, 204b Reflected light

The invention claimed is:

1. A light diffusion control member comprising:
a first light diffusion control layer; and
a second light diffusion control layer laminated on one surface side of the first light diffusion control layer,
wherein the first light diffusion control layer and the second light diffusion control layer each have a regular internal structure comprising a plurality of regions having a relatively high refractive index in a region having a relatively low refractive index,
wherein when a first surface is defined as a surface of the light diffusion control member proximal to the first light diffusion control layer and a second surface is defined as a surface of the light diffusion control member proximal to the second light diffusion control layer, and wherein a thickness direction of the light diffusion control member is orthogonal to the first surface and the second surface, and wherein a surface direction is perpendicular to the thickness direction,
the regions having the relatively high refractive index each extend from the second surface side toward the first surface side in an extending direction, and wherein a straight line, which is parallel to the extending direction of the regions, is tilted with respect to the thickness direction of the light diffusion control member in each of the first light diffusion control layer and the second light diffusion control layer,
wherein the first light diffusion control layer has a first extending direction having a first surface-direction vector and a first thickness-direction vector, and the second light diffusion control layer has a second extending direction having a second surface-direction vector and a second thickness-direction vector, and wherein the first light diffusion control layer and the second light diffusion control layer are laminated so that, an angle between the first surface-direction vector and the second surface-direction vector is more than 0° and 90° or less.

2. The light diffusion control member according to claim 1, wherein at least in one of the first light diffusion control layer and the second light diffusion control layer,
the regions having the relatively high refractive index are columnar bodies extending from the second surface side toward the first surface side, and
the regular internal structure is a column structure configured such that the columnar bodies are densely arranged to stand in the region having the relatively low refractive index.

3. The light diffusion control member according to claim 2, wherein the columnar bodies are bent between one ends and other ends of the columnar bodies.

4. A reflective display body configured such that an up-down direction of display content on a display surface can be changed, the reflective display body comprising:
the light diffusion control member according to claim 3;
a display device provided on one surface side of the light diffusion control member; and
a reflective layer provided on a surface side of the display device opposite to the light diffusion control member or incorporated in the display device.

5. A reflective display body configured such that an up-down direction of display content on a display surface can be changed, the reflective display body comprising:
the light diffusion control member according to claim 2;
a display device provided on one surface side of the light diffusion control member; and
a reflective layer provided on a surface side of the display device opposite to the light diffusion control member or incorporated in the display device.

6. A reflective display body configured such that an up-down direction of display content on a display surface can be changed, the reflective display body comprising:
the light diffusion control member according to claim 1;
a display device provided on one surface side of the light diffusion control member; and
a reflective layer provided on a surface side of the display device opposite to the light diffusion control member or incorporated in the display device.

7. A light diffusion control member comprising a light diffusion control layer, the light diffusion control layer having a regular internal structure comprising a plurality of regions having a relatively high refractive index in a region having a relatively low refractive index,
wherein when preparing a measurement sample by laminating the light diffusion control member on a reflective surface of a mirror; irradiating an arbitrary one point on a surface of the measurement sample on the light diffusion control member side with light rays from each of four directions of orientation angles of 0°, 90°, 180°, and 270° around the one point to cause reflected light to be diffused and reflected from the one point at each of the orientation angles, the light rays forming an angle of 30° with a normal line of the surface of the measurement sample, the reflected light including reflected light directed in a front direction of the surface of the measurement sample; measuring, at the orientation angles, respective luminance values (cd/m$^2$) of the reflected light directed in the front direction of the surface of the measurement sample; and representing a minimum luminance value and a maximum luminance value among the obtained four luminance values as $L_{min}$ and $L_{max}$, respectively, and irradiating an arbitrary one point on one surface of any standard white plate with light rays from the orientation angle at which the $L_{min}$ is measured, the light rays forming an angle of 30° with a normal line of the one surface; and representing the luminance value (cd/m²) of reflected light obtained by diffusion and reflection from the one point in the front direction as $L_{STD}$, $L_1$ represented by $L_1 = L_{min}/L_{STD}$ satisfies following expression (1):

$$L_1 > 1.00 \quad (1), \text{ and}$$

$L_2$ represented by $L_2 = L_{min}/L_{max}$ satisfies following expression (2):

$$0.6 \leq L_2 \leq 1.00 \quad (2),$$

wherein when irradiating an arbitrary one point on a surface of the measurement sample on the light diffusion control member side with light rays from each of four directions of orientation angles of 0°, 90°, 180°, and 270° around the one point to cause reflected light to be diffused and reflected from the one point at each of the orientation angles, the light rays forming an angle of 30° with a normal line of the surface of the measurement sample, the reflected light including reflected light beams that travel in a plane including the one point and the nominal line and are perpendicular to the orientation angle of irradiation with the light rays, the reflected light beams forming an angle of 30° or less with the normal line; and representing a standard deviation value (cd/m²) of luminance values of the reflected light beams as $L_3$, the light diffusion control member satisfies following expression (3) in all the four directions:

$$L_3 < 2.00 \quad (3).$$

8. A reflective display body configured such that an up-down direction of display content on a display surface can be changed, the reflective display body comprising:
   the light diffusion control member according to claim 7;
   a display device provided on one surface side of the light diffusion control member; and
   a reflective layer provided on a surface side of the display device opposite to the light diffusion control member or incorporated in the display device.

* * * * *